United States Patent
Okano

(10) Patent No.: US 8,672,093 B2
(45) Date of Patent: Mar. 18, 2014

(54) WIND TURBINE GENERATOR

(75) Inventor: Yasushi Okano, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 695 days.

(21) Appl. No.: 12/520,174

(22) PCT Filed: Oct. 17, 2008

(86) PCT No.: PCT/JP2008/068893
§ 371 (c)(1),
(2), (4) Date: Jul. 14, 2009

(87) PCT Pub. No.: WO2010/044171
PCT Pub. Date: Apr. 22, 2010

(65) Prior Publication Data
US 2010/0329869 A1 Dec. 30, 2010

(51) Int. Cl.
 F16N 1/00 (2006.01)
 F16H 57/04 (2010.01)
 F03D 11/00 (2006.01)
(52) U.S. Cl.
 USPC .............. 184/4; 184/6.12; 416/174
(58) Field of Classification Search
 USPC .......... 184/1.5, 4, 6.12, 26, 27.1; 123/196 R; 417/170 R, 174; 475/159; 416/170 R, 416/174
 See application file for complete search history.

(56) References Cited

U.S. PATENT DOCUMENTS

| | | | |
|---|---|---|---|
| 6,360,791 B2 * | 3/2002 | Rome et al. | 141/98 |
| RE38,232 E * | 8/2003 | Rome et al. | 141/98 |
| 7,946,389 B2 * | 5/2011 | Kakinami et al. | 184/27.2 |
| 2004/0188180 A1 * | 9/2004 | Wheeler | 184/6.12 |
| 2005/0034925 A1 * | 2/2005 | Flamang et al. | 184/6.12 |
| 2009/0191060 A1 * | 7/2009 | Bagepalli et al. | 416/174 |
| 2010/0056315 A1 * | 3/2010 | Scholte-Wassink | 475/159 |
| 2011/0217173 A1 * | 9/2011 | Mallada et al. | 416/170 R |

FOREIGN PATENT DOCUMENTS

| | | |
|---|---|---|
| AU | 2008331348 A1 | 3/2010 |
| DE | 3231016 A1 | 2/1984 |
| JP | 53146069 A | 12/1978 |
| JP | 04-031611 A | 2/1992 |

(Continued)

OTHER PUBLICATIONS

OA for Australian Patent Application No. 2008331352, mailed Apr. 13, 2011.

(Continued)

*Primary Examiner* — William E Dondero
*Assistant Examiner* — Robert T Reese
(74) *Attorney, Agent, or Firm* — Kanesaka Berner & Partners, LLP

(57) ABSTRACT

A wind turbine generator that is capable of completely eliminating heater heating of lubricating-oil piping or that is capable of reducing the number of heater heating locations to the minimum requirement is provided. A wind turbine generator is provided with a lubricating system that circulates lubricating oil (L) in a lubricating-oil storage tank through lubricating-oil piping connected to a lubricating-oil pump, to lubricate a main bearing connected to the lubricating-oil piping by supplying the lubricating oil (L) thereto. This lubricating system is provided with a lubricating-oil recovery line that is formed when the lubricating-oil pump is stopped and in which the lubricating oil (L) falls naturally and is recovered in the lubricating-oil storage tank.

4 Claims, 3 Drawing Sheets

(56) References Cited

FOREIGN PATENT DOCUMENTS

| JP | 05-026024 A | 2/1993 |
|---|---|---|
| JP | 2000110537 A | 4/2000 |
| JP | 2005-155698 A | 6/2005 |
| JP | 2005-207264 A | 8/2005 |
| WO | 03029671 | 4/2003 |
| WO | 2009147147 A2 | 12/2009 |

OTHER PUBLICATIONS

European Search Report issued on Oct. 23, 2012 for corresponding European Patent Application No. 08877429.4.

* cited by examiner

WIND TURBINE GENERATOR

RELATED APPLICATIONS

The present application is based on, and claims priority from, International Application Number PCT/JP2008/068893, filed Oct. 17, 2008, the disclosure of which is hereby incorporated by reference herein in its entirety.

TECHNICAL FIELD

The present invention relates to wind turbine generators for use in cold regions and, in particular, to a wind turbine generator that can ensure flowability of lubricating-oil during low-temperature starting.

BACKGROUND ART

A wind turbine generator is a device that generates electricity by rotating a rotor head provided with wind-turbine blades with received wind force, and increasing the rotational speed thereof with a gearbox to drive a generator. For this reason, sliding parts requiring lubrication, for example, the gearbox, bearings, and the like, exist in the wind turbine generator, and the generator is provided with a lubricating system for supplying lubricating oil to the sliding parts from a lubricating-oil tank using a lubricating-oil pump.

In a hydraulic circuit of a hydraulic machine, a structure that easily and reliably ensures warming up operation when starting an engine and heat balance during operation has been proposed. This conventional technology has been constructed so as to provide a cooling flow path and a non-cooling flow path, differing in the presence of an oil cooler, and to be able to select and change flow paths for return oil returning to a lubricating-oil tank with a direction switching valve (for example, see Patent Document 1).

Patent Document 1: Japanese Unexamined Patent Application, Publication No. 2005-155698

DISCLOSURE OF INVENTION

A wind turbine generator to be installed in a cold region is sometimes started under low-temperature conditions, for example, an outside air temperature of −30° C. or lower, and it is conceivable that the temperature of piping and the equipment itself can reach a low temperature of about −40° C. at starting time. Under such low-temperature conditions, the kinematic viscosity of lubricating oil increases dramatically, and therefore, in order to ensure flowability of the lubricating oil at starting time, it has been required to forcibly heat the lubricating-oil piping with heaters and the like.

Specifically, when the lubricating-oil pump is stopped during a power failure or when the wind turbine generator is stopped, the lubricating oil being circulated will remain in the lubricating-oil piping. At this time, if the surrounding environment is at low temperature, the lubricating oil remaining within the lubricating-oil piping is cooled, and therefore, the kinematic viscosity thereof is increased, thus deteriorating its flowability. As a result, there is concern that, if the lubricating-oil pump is started in the state where the kinematic viscosity of the lubricating oil is high, the pump load is increased due to the increased pressure loss, and problems such as pump trip and the like may occur.

Consequently, especially with regard to the part of the lubricating-oil piping where lubricating oil remains, a countermeasure is necessary for heating the entire piping.

However, heating of the part where the lubricating oil remains using a heater involves, in addition to consumption of additional energy, a risk that when a defect occurs in the heater, increased kinematic viscosity of the lubricating oil cannot be avoided. Therefore, in order to improve reliability of a wind turbine generator in a cold region, it is desirable to either completely eliminate heater heating of the lubricating-oil piping or to reduce the number of heater heating locations to the minimum requirement.

An object of the present invention, which has been made in light of the above circumstances, is to provide a wind turbine generator that can either completely eliminate heater heating of the lubricating-oil piping or reduce the number of heater heating locations to the minimum requirement.

To achieve the above object, the present invention employs the following solutions.

A wind turbine generator according to the present invention comprises a lubricating system that circulates lubricating oil in a lubricating-oil storage space through a lubricating-oil flow path connected to a lubricating-oil pump, to lubricate a sliding part connected to the lubricating-oil flow path by supplying the lubricating oil thereto, wherein the lubricating system is provided with a lubricating-oil recovery line that is formed when the lubricating-oil pump is stopped and in which the lubricating-oil falls naturally and is recovered in the lubricating-oil storage space.

According to such a wind turbine generator, the lubricating system is provided with the lubricating-oil recovery line that is formed when the lubricating-oil pump is stopped and in which the lubricating oil falls naturally and is recovered in the lubricating-oil storage space; therefore, when the operation of the lubricating-oil pump is stopped at the time of power failure or when the wind turbine generator is stopped, the lubricating-oil recovery line is formed and the lubricating oil in the lubricating system falls naturally and is recovered in the lubricating-oil storage space. Specifically, at the time of lubricating-oil recovery during which the operation of the lubricating-oil pump is stopped due to a power failure or the like, the lubricating oil falls naturally in the lubricating-oil storage space through the lubricating-oil recovery line, thereby making it possible to clear the lubricating-oil remaining in the lubricating-oil flow path.

In the above-described invention, it is preferable that the lubricating-oil recovery line comprise a check valve disposed at a low position at a discharge side of the lubricating-oil flow path; a lubricating-oil return flow path branched off from the vicinity of a downstream side of the check valve and connected to the lubricating-oil storage space; and an automatic opening/closing valve that is disposed in the lubricating-oil return flow path and that is closed during normal operation and opened at the time of lubricating-oil recovery.

According to such a construction, at the time of lubricating-oil recovery, during which the operation of the lubricating-oil pump is stopped, the lubricating-oil recovery line is formed by opening the automatic opening/closing valve in the lubricating-oil return flow path. Thus, the lubricating-oil remaining above the check valve at the discharge side of the lubricating-oil flow path and on the upstream side of the highest position of the lubricating-oil flow path falls naturally due to gravity, and is recovered in the lubricating-oil storage space through the lubricating-oil return flow path. The lubricating oil on downstream side of the highest position in the flow path falls naturally in the lubricating-oil flow path as it is and is recovered in the lubricating-oil storage space.

In the above-described invention, it is preferable to dispose an air vent that communicates with the atmosphere at the time of lubricating-oil recovery, at the highest position in the lubricating-oil flow path; thereby, at the time of lubricating-oil recovery, the lubricating oil in the lubricating-oil flow path is separated to the upstream side and the downstream side, with the highest position in the lubricating-oil flow path defined as a boundary, and the lubricating oil at the respective sides is smoothly recovered through the lubricating-oil return flow path and the lubricating-oil flow path.

According to the wind turbine generator of the above-described invention, since the lubricating oil can be recovered from the lubricating-oil flow path of the lubricating-oil system when the lubricating-oil pump is stopped, even when the wind turbine generator is installed in a cold region, it is possible to completely eliminate heater heating of the lubricating-oil piping or reduce the number of heater heating locations to the minimum requirement.

As a result, it is possible to reduce or eliminate the energy consumed for heating the part where the lubricating-oil remains, at the time of power failure or when the wind turbine generator is stopped. In other words, it is possible to provide a wind turbine generator having low running costs. Furthermore, when starting the lubricating-oil pump, since it is possible to prevent malfunctions, such as pump trip, due to the remaining lubricating oil having increased kinematic viscosity, a wind turbine generator having high reliability, consequently, a wind turbine generator having high availability, can be provided.

BEST MODE FOR CARRYING OUT THE INVENTION

In the following, an embodiment of the wind turbine generator according to the present invention will be described with reference to FIGS. 1 to 3.

Figure 3:
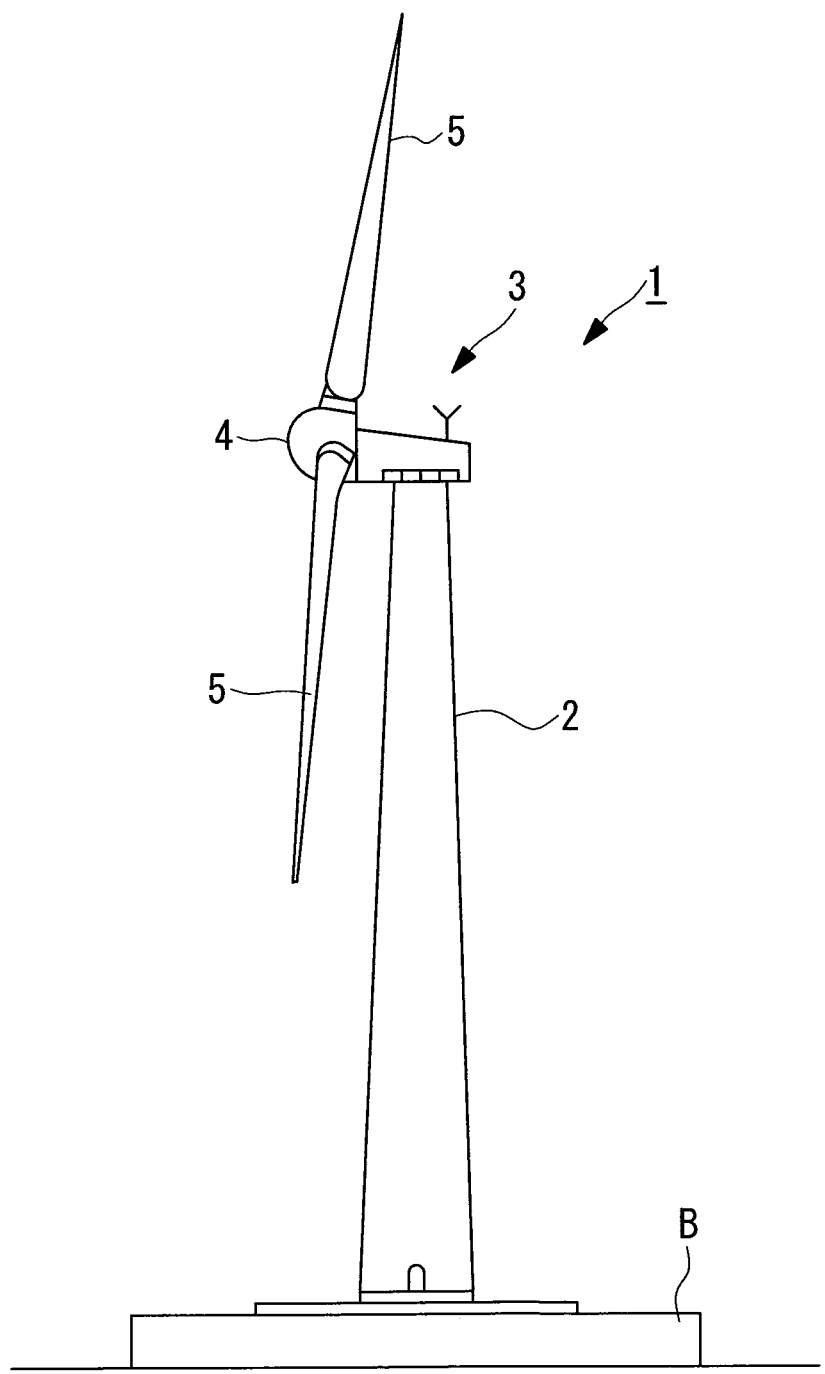
FIG. 3 is a diagram showing an example of the overall structure of the wind turbine generator according to the present invention.

A wind turbine generator 1 shown in FIG. 3 includes a tower 2 mounted upright on a foundation B, a nacelle 3 installed on the top end of the tower 2, and a rotor head 4 disposed on the nacelle 3 so as to be supported rotatably about a substantially horizontal rotational axis.

The rotor head 4 has a plurality of (for example, three) wind-turbine rotor blades 5 attached in a radiating pattern around its rotational axis. Thereby, the force of wind striking the wind-turbine rotor blades 5 in the rotational axis direction of the rotor head 4 is converted to motive power rotating the rotor head 4 about the rotational axis.

The wind turbine generator 1 described above is provided with a gearbox and a generator that are disposed in the nacelle 3 to construct a drivetrain.

Figure 1:
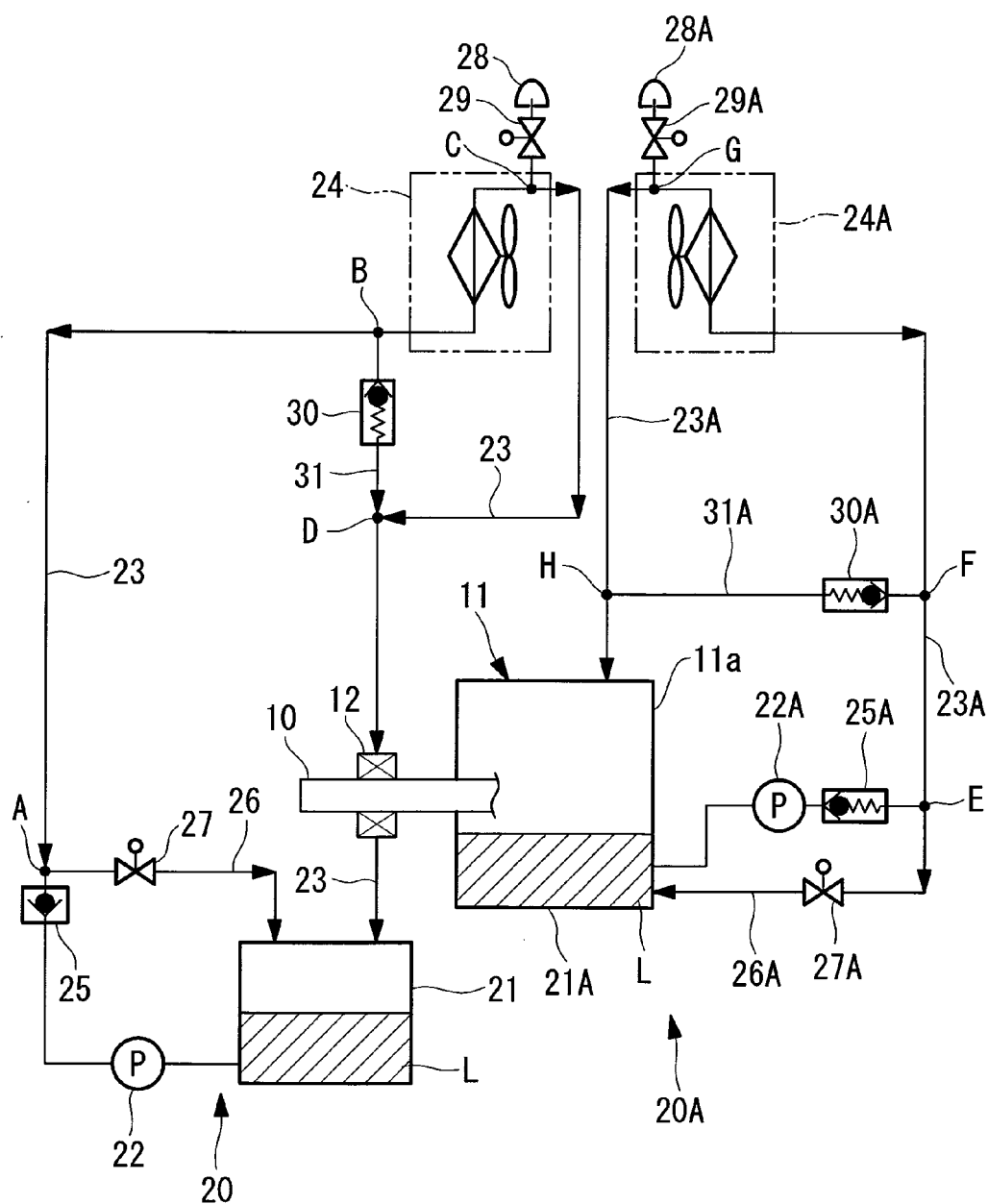
FIG. 1 is a diagram showing a lubricating-oil feed line, in a state during recovery of lubricating oil, as one embodiment of a wind turbine generator according to the present invention.
Figure 2:
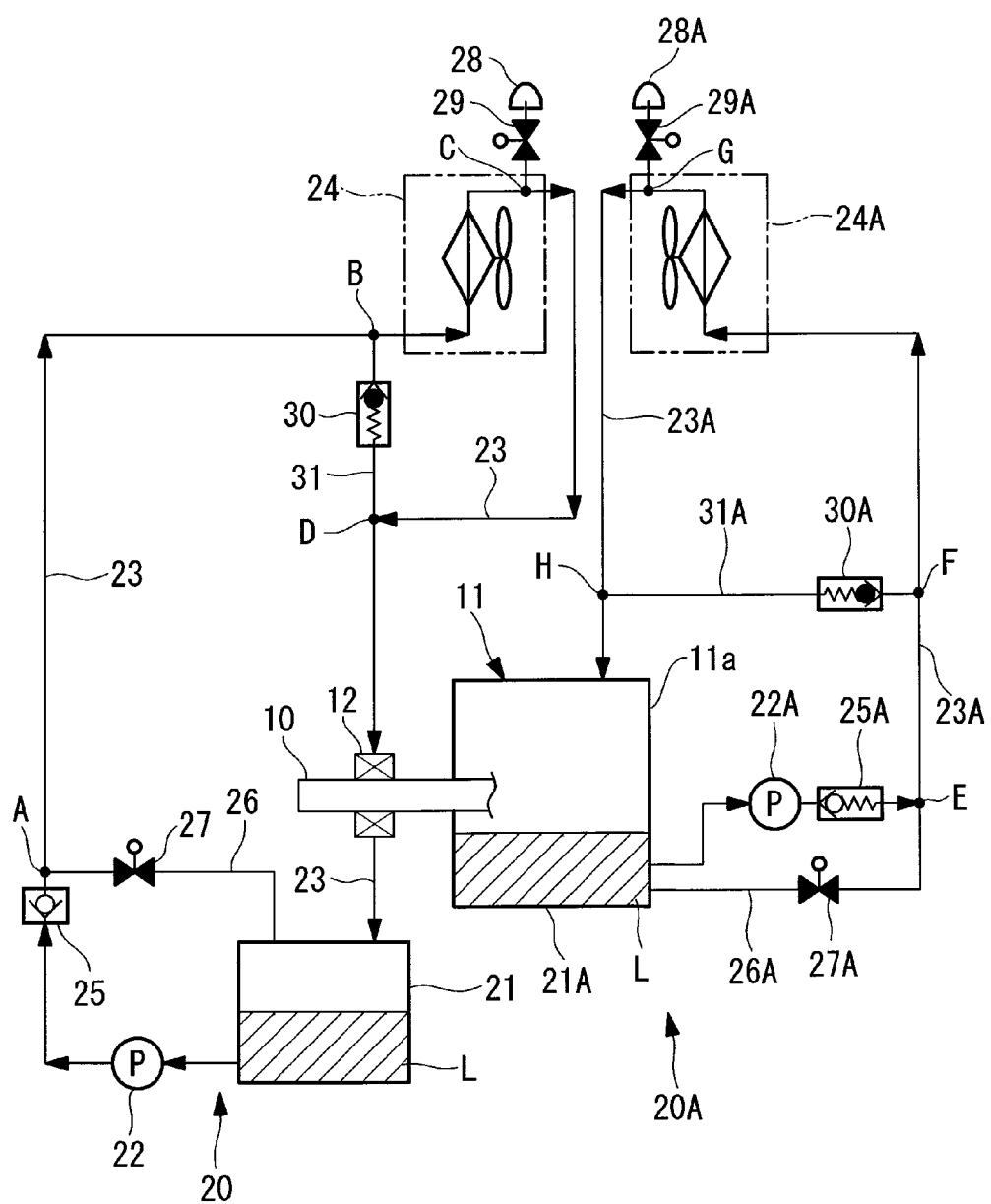
FIG. 2 is a diagram showing the lubricating-oil feed line, in a state during normal operation, as one embodiment of the wind turbine generator according to the present invention.

As shown in FIGS. 1 and 2, the drivetrain of the wind turbine generator 1 is provided with the generator (not illustrated) and the gearbox 11 linked to a main shaft 10 that rotates together with the rotor head 4. This drivetrain is so constructed that the gearbox 11 accelerates the rotation of the rotor head 4 to drive the generator, thereby generating electricity with the generator.

The above-described wind turbine generator 1 is provided with a lubricating system that achieves lubrication by supplying lubricating oil to sliding parts, such as the drivetrain and the like. In the following, as an example of the lubricating system lubricating the sliding parts, an example construction of a lubricating-oil supply system supplying the lubricating-oil to the gearbox 11 and a main bearing 12 that supports the main shaft 10 is explained with reference to FIG. 1 and FIG. 2.

FIG. 1 illustrates a state (lubricating-oil flow path) in which the lubricating oil flows at the time of lubricating-oil recovery, and FIG. 2 illustrates a state (lubricating-oil flow path) in which the lubricating oil flows during normal operation, showing the respective flow directions of the lubricating oil with arrows. Regarding opened and closed states of the respective valves, those in the closed state are illustrated by filling with solid black.

First, a lubricating system 20 of the main bearing 12 is described.

This lubricating system 20 achieves lubrication by supplying lubricating oil L to the main bearing 12, which is connected to lubricating-oil piping 23, by circulating the lubricating oil L in a lubricating-oil storage tank (lubricating-oil storage space) 21 through the lubricating-oil piping (lubricating-oil flow path) 23 connected to a lubricating-oil pump 22. The lubricating oil L that has lubricated the main bearing 12 is recovered in the lubricating-oil storage tank 21.

Further, the illustrated lubricating-oil system 20 is provided with an oil cooler 24 between the lubricating-oil pump 22 and the main bearing 12 to prevent an increase in the temperature of the circulating lubricating oil L.

The illustrated lubricating-oil system 20 is provided with a lubricating-oil recovery line that is formed when the lubricating-oil pump 22 is stopped and in which the lubricating oil L falls naturally and is recovered in the lubricating-oil storage tank 21. This lubricating-oil recovery line is constructed of a check valve 25 disposed at a low position at the discharge side of the lubricating-oil piping 23, lubricating-oil return piping (flow path) 26 that is branched off from the vicinity of the downstream side of the check valve 25 and connected to the lubricating-oil storage tank 21, and an automatic opening/closing valve 27 that is disposed in the lubricating-oil return piping 26 and that is closed during normal operation and opened during lubricating-oil recovery.

In this case, the lubricating-oil storage tank 21 and the lubricating-oil pump 22 are located at the lowest position vertically.

Furthermore, the above-described lubricating-oil system 20 is provided, at the highest position in the lubricating-oil piping 23 forming the lubricating-oil flow path, with an air vent 28 that communicates with the atmosphere at the time of lubricating-oil recovery. In this case, the air vent 28 is provided with an automatic opening/closing valve 29 that is closed during normal operation and opened at the time of lubricating-oil recovery, and is attached so as to be branched off from an exit piping part of the oil cooler 24 that is disposed at the highest position in the lubricating-oil system 20.

The above-described automatic opening/closing valves 27 and 29 are both opening/closing valves that are in the fully closed state during normal operation and are fully opened automatically at the time of lubricating-oil recovery; well-known opening/closing valves, such as those of the diaphragm type utilizing a pressure difference of the lubricating oil, which is a fluid, or those that open automatically at the time of power failure, or those that perform opening/closing operation with an emergency electric power source, for example, may be suitably selected for use.

The illustrated lubricating-oil system 20 is provided with the oil cooler 24 that cools the lubricating oil L, and cooler bypass piping (flow path) 31 that is branched from the lubricating-oil piping 23 and equipped with a check valve 30 is provided at an entrance piping part at the upstream side of this oil cooler 24. This cooler bypass piping 31 is connected to the lubricating-oil storage tank 21 through the lubricating-oil piping 23.

With the lubricating system 20 so constructed, during the normal operation shown in FIG. 2, by operating the lubricating-oil pump 22, the lubricating oil L in the lubricating-oil storage tank 21 is circulated through the lubricating-oil piping 23, as shown with arrows in the figure.

In other words, the lubricating oil L in the lubricating-oil storage tank 21 is pressurized by the lubricating-oil pump 22 and is discharged to the lubricating-oil piping 23. This lubricating oil L passes through the check valve 25, rises in the lubricating-oil piping 23, and flows into the oil cooler 24. At this time, since the automatic opening/closing valve 27 is closed, all of the lubricating oil L passing through the branching point A is guided to the oil cooler 24.

Furthermore, the check valve 30 is also closed by the biasing force of a spring provided inside; thus, all of the lubricating oil passing through the branching point B is guided to the oil cooler 24. However, when the filter of the oil cooler 24 is blocked and the flow path resistance is increased, for example, the check valve 30 is opened due to the pressure increase of the lubricating oil L; thus the lubricating oil L is supplied to the main bearing 12 through the cooler bypass piping 31 that bypasses the oil cooler 24.

The lubricating oil L passing through the oil cooler 24 is cooled by heat exchange with the outside air. During normal operation, since the automatic opening/closing valve 29 disposed in the piping branched off from the branching point C is in a fully closed state, the lubricating oil L will not be discharged outside the piping route through the air vent 28.

The lubricating oil L cooled in the oil cooler 24 is supplied to the main bearing 12 through the lubricating-oil flow path 23. This lubricating oil L is returned, after lubricating required locations, to the lubricating-oil storage tank 21 through the lubricating-oil piping 23.

Since the check valve 30 is fully closed, all of the lubricating oil L passing through the branching point D is supplied to the main bearing 12. However, when the filter of the oil cooler 24 is blocked and the flow path resistance is increased, for example, the check valve 30 is opened due to the pressure increase of the lubricating oil L; thus the lubricating oil L is supplied to the main bearing 12 through the cooler bypass piping 31 that bypasses the oil cooler 24.

Thereafter, the lubricating oil L is circulated in the lubricating-oil piping 23 by following a similar route to continuously achieve lubrication of the main bearing 12.

Next, when the operation of the wind turbine generator 1 is stopped due to power failure or wind stronger than a prescribed level, the operation of the lubricating-oil pump 22 is also stopped. When the lubricating-oil pump 22 is stopped in this manner, the lubricating oil L remaining inside the lubricating-oil piping 23 is recovered to the lubricating-oil storage tank 21 to prevent an increase in the kinematic viscosity of the lubricating oil L in a cold region.

At the time of such lubricating-oil recovery, as shown in FIG. 1, the operation of the lubricating-oil pump 22 is stopped, and the automatic opening/closing valves 27 and 29 are opened fully.

As a result, a state where the branching point C of the lubricating-oil piping 23 communicates with the atmosphere through the air vent 28 is achieved. Therefore, the lubricating oil L remaining in the lubricating-oil piping 23 at the lubricating-oil pump 22 side of the branching point C falls freely due to gravity to a branching point A located at a lower position, and then flows into the lubricating-oil return flow path 26 in which the automatic opening/closing valve 27 is in the opened state, and is recovered in the lubricating-oil storage tank 21.

On the other hand, the lubricating oil L remaining in the lubricating-oil piping 23 at the main bearing 12 side of the branching point C falls freely, through the branching point D and the main bearing 12 located at lower positions, into the lubricating-oil storage tank 21 and is recovered therein.

Next, a lubricating system 20A of the gearbox 11 is explained.

In this lubricating system 20A, a casing 11a of the gearbox 11 is used as a lubricating-oil storage tank 21A. In other words, the lubricating oil L stored in the bottom part of the casing 11a is supplied to the sliding parts of the gearbox 11 through lubricating-oil piping 23A connected to a lubricating-oil pump 22A, and is then recovered in the lubricating-oil storage tank 21A in the bottom part of the casing after lubricating required locations in the gearbox 11.

The lubricating-oil system 20A in this case is provided with an oil cooler 24A between the lubricating-oil pump 22 and the gearbox 11 to prevent a temperature increase in the lubricating oil L.

The illustrated lubricating-oil system 20A is provided with a lubricating-oil recovery line that is formed when the lubricating-oil pump 22A is stopped and in which the lubricating oil L falls naturally and is recovered in the lubricating-oil storage tank 21A. This lubricating-oil recovery line is constructed of a check valve 25A disposed at a low position at the discharge side of the lubricating-oil piping 23A, lubricating-oil return piping 26A that is branched off from the vicinity of the downstream side of the check valve 25A and connected to the lubricating-oil storage tank 21A, and an automatic opening/closing valve 27A that is disposed in the lubricating-oil return piping 26A and that is closed during normal operation and opened during lubricating-oil recovery.

In this case, the lubricating-oil storage tank 21A is located at the lowest position vertically.

Furthermore, an air vent 28A is provided at the highest position in the lubricating-oil piping 23A in the above-described lubricating-oil system 20A. In this case, the air vent 28A is provided with an automatic opening/closing valve 29A that is closed during normal operation and opened at the time of lubricating-oil recovery, and the vent is attached so as to be branched off from an exit piping part of the oil cooler 24A that is disposed at the highest position in the lubricating-oil system 20A.

The above-described automatic opening/closing valves 27A and 29A are both well-known opening/closing valves that are in the fully closed state during normal operation and are fully opened automatically at the time of lubricating-oil recovery.

The illustrated lubricating-oil system 20A is provided with the oil cooler 24A that cools the lubricating oil L, and cooler bypass piping 31A that is branched from the lubricating-oil piping 23A and equipped with a check valve 30A is provided at the entrance piping part at the upstream side of this oil cooler 24A. This cooler bypass piping 31A is connected to the lubricating-oil storage tank 21A through the lubricating-oil piping 23A.

With the lubricating system 20A so constructed, during the normal operation shown in FIG. 2, by operating the lubricating-oil pump 22A, the lubricating oil L in the lubricating-oil storage tank 21A is pressurized by the lubricating-oil pump 21A and circulated through the lubricating-oil piping 23A. This lubricating oil L passes through the check valve 25A by forcedly opening it, rises in the lubricating-oil piping 23A, and flows into the oil cooler 24A. At this time, since the automatic opening/closing valve 27A is closed, all of the lubricating oil L passing through the branching point E is guided to the oil cooler 24A.

Furthermore, the check valve 30A is also closed by the biasing force of a spring provided inside; thus, all of the lubricating-oil passing through the branching point F is guided to the oil cooler 24A.

The lubricating oil L passing through the oil cooler 24A is cooled by heat exchange with the outside air. During normal operation, since the automatic opening/closing valve 29A disposed in the piping branched off from the branching point G is in a fully closed state, the lubricating oil L will not be discharged outside the piping route through the air vent 28A.

The lubricating oil L cooled in the oil cooler 24A is supplied to the gearbox 11 through the lubricating-oil flow path 23A. This lubricating oil L is returned, after lubricating required locations within the gearbox 11, to the lubricating-oil storage tank 21A through the lubricating-oil piping 23A. At this time, since the check valve 30A is fully closed, all of the lubricating oil L passing through the branching point H is supplied to the gearbox 11. In this case, since the check valve 30A is opened by the pressure increase of the lubricating oil L, such as when the filter of the oil cooler 24A is blocked, thus increasing the flow path resistance, the lubricating oil L is supplied to the gearbox 11 through the cooler bypass piping 31A that bypasses the oil cooler 24A.

Thereafter, the lubricating oil L is circulated in the lubricating-oil piping 23A by following a similar route to continuously achieve lubrication of the gearbox 11.

Next, at the time of lubricating-oil recovery, during which the operation of the lubricating-oil pump 22A is to be stopped, as shown in FIG. 1, the operation of the lubricating-oil pump 22A is stopped and the automatic opening/closing valves 27A and 29A are also fully opened.

As a result, a state where the branching point G of the lubricating-oil piping 23A communicates with the atmosphere through the air vent 28A is achieved. Therefore, the lubricating oil L remaining in the lubricating-oil piping 23A at the lubricating-oil pump 22A side of the branching point G falls freely due to gravity to the branching point E located at a lower position, flows into the lubricating-oil return flow path 26A in which the automatic opening/closing valve 27A is in the opened state, and is recovered in the lubricating-oil storage tank 21A.

On the other hand, the lubricating oil L remaining in the lubricating-oil piping 23A at the gearbox 11 side of the branching point G falls freely, through the branching point H and the gearbox 11 located at lower positions, into the lubricating-oil storage tank 21A and is recovered therein.

In this way, the wind turbine generator 1 of the present invention is provided with the lubricating systems 20 and 20A that circulate the lubricating oil L in the lubricating-oil storage tanks 21 and 21A through the lubricating-oil piping 23 and 23A connected to the lubricating-oil pumps 22 and 22A, supply the lubricating oil L to the sliding parts in the main bearing 12 and the gearbox 11 connected to the lubricating-oil piping 23 and 23A, and lubricate them.

These lubricating systems 20 and 20A are provided with the lubricating-oil recovery lines formed when the lubricating-oil pumps 22 and 22A are stopped. These lubricating-oil recovery lines are capable of recovering the lubricating oil L in the lubricating-oil storage tanks 21 and 21A through the lubricating-oil piping 23 and 23A and the lubricating-oil return piping 26 and 26A in which the lubricating oil falls naturally.

Therefore, the lubricating systems 20 and 20A can clear the lubricating oil remaining in the lubricating-oil piping 23 and 23A at the time of lubricating-oil recovery, during which the operation of the lubricating-oil pumps 21 and 21A is stopped at the time of power failure or when the wind turbine generator 1 is stopped.

Specifically, at the time of lubricating-oil recovery, the automatic opening/closing valves 27 and 27A of the lubricating-oil return flow paths 26 and 26A are opened to form the lubricating-oil recovery line; therefore, the lubricating oil L remaining above the check valves 25 and 25A that are at the discharging side of the lubricating-oil piping 23 and 23A and on the upstream side of the branching points C and G located at the highest positions in the lubricating-oil piping 23 and 23A falls naturally due to gravity and is recovered in the lubricating-oil storage tanks 21 and 21A through the lubricating-oil return flow paths 26 and 26A. On the other hand, the lubricating oil L remaining on downstream side of the branching points C and G located at the highest position in the lubricating-oil piping 23 and 23A naturally falls in the lubricating-oil piping 23 and 23A as it is and is recovered in the lubricating-oil storage tanks 21 and 21A.

Furthermore, the air vents 28 and 28A are disposed at the branching points C and G located at the highest positions in the lubricating-oil piping 23 and 23A and communicate with the atmosphere at the time of lubricating-oil recovery; thereby, at the time of lubricating-oil recovery, the lubricating oil L in the lubricating-oil piping 23 and 23A is immediately separated to the upstream side and the downstream side from the highest positions in the lubricating-oil piping 23 and 23A. As a result, the clearly separated lubricating oil L is recovered smoothly, through the respective lubricating-oil return flow paths 26 and 26A and the lubricating-oil piping 23 and 23A.

As stated above, according to the wind turbine generator 1 of the above-described invention, since the lubricating oil L can be surely recovered from the lubricating-oil piping 23 and 23A of the lubricating-oil systems 20 and 20A when the lubricating-oil pumps 22 and 22A are stopped, even when the generator is installed in a cold region where there is concern about an increase in the kinematic viscosity of the lubricating-oil L, it is possible to completely eliminate heater heating of the lubricating-oil piping 23 and 23A or reduce the number of heater heating locations to the minimum requirement.

In the illustrated exemplary construction, since there will be no lubricating oil L remaining in the lubricating-oil piping 23 and 23A at the downstream side of the check valves 25 and 25A, there will be no need to provide heaters at this section for heating.

As a result, it is possible to reduce or eliminate the energy consumed for heating the part where the lubricating oil remains, at the time of power failure or when the wind turbine generator 1 is stopped.

Furthermore, when starting the lubricating-oil pumps 21 and 21A, it is not required to handle lubricating oil L whose kinematic viscosity has been increased; therefore the occurrence of malfunctions, such as pump trip, can be avoided, and the reliability of starting up the wind turbine generator in an extremely cold state is improved.

In the above-described embodiment, although the oil coolers 24 and 24A, the air vents 28 and 28A, and the cooler bypass piping 31 and 31A are provided, these are not essential elements and may be optionally provided, as required.

Furthermore, with the lubricating-oil return piping 26 and 26A provided with the automatic opening/closing valves 27 and 27A, although there is one set thereof in the above-described embodiment, in order to clear the remaining lubricating oil L completely, the number of sets will be suitably changed depending on the number of vertical levels of the lubricating-oil piping 23 and 23A.

Furthermore, although the above-described embodiment is applied to the lubricating systems 20 and 20A of the main bearing 12 and the gearbox 11, it is needless to say that it is also applicable to a lubricating system lubricating the other sliding parts in the wind turbine generator 1 installed in a cold region.

The present invention is not limited to the above-described embodiment and may be modified as appropriate without departing from the spirit thereof.

The invention claimed is:

1. A wind turbine generator, comprising: a lubricating system including
    a lubricating-oil storage space;
    a lubricating-oil pump; and
    a lubricating-oil flow path connected to the lubricating-oil pump;
    wherein
    the lubricating system is configured to circulate lubricating oil in the lubricating-oil storage space through the lubricating-oil flow path;
    the lubricating system further comprises
        a lubricating-oil recovery line which is configured to be formed when the lubricating-oil pump is stopped for lubricating-oil recovery and in which the lubricating oil drains by way of gravity and is recovered in the lubricating-oil storage space, and
        a plurality of air vents that communicates with an atmosphere at a time of lubricating-oil recovery and that is disposed at a highest position in the lubricating-oil flow path; and
    the lubricating-oil recovery line comprises:
        a check valve disposed at a low position at a discharge side of the lubricating-oil flow path;
        a lubricating-oil return flow path branched off from a downstream side of the check valve and connected to the lubricating-oil storage space; and
        a plurality of automatic opening/closing valves that is disposed in the lubricating-oil return flow path and in the plurality of air vents, and each of the automatic opening/closing valves is configured to be closed during operation of the lubricating-oil pump and opened at the time of lubricating-oil recovery when the lubricating-oil pump is stopped.

2. The wind turbine generator according to claim 1, further comprising a part to be lubricated, said part connected to the lubricating-oil flow path.

3. The wind turbine generator according to claim 2, wherein said part is a gearbox of the wind turbine generator.

4. The wind turbine generator according to claim 2, wherein said part is a bearing of a main shaft.

* * * * *